United States Patent

[11] 3,633,421

[72] Inventor James W. Phillips
     Michigan City, Ind.
[21] Appl. No. 30,902
[22] Filed Apr. 22, 1970
[45] Patented Jan. 11, 1972
[73] Assignee Dwyer Instruments, Inc.

[54] MOLDED PLASTIC FLOWMETER AND CONTROL VALVE THEREFOR
5 Claims, 6 Drawing Figs.

[52] U.S. Cl. .................................................. 73/209, 251/208, 251/310
[51] Int. Cl. ...................................................... G01f 1/00
[50] Field of Search .................................. 73/209, 210; 251/208, 310, 311, 85; 137/559

[56] References Cited
UNITED STATES PATENTS
3,232,107  2/1966  Busillo .......................... 73/209
1,947,637  2/1934  Bolster ........................ 251/208 X
3,475,002  10/1969  Phillips ....................... 251/311 X FOREIGN PATENTS
116,880  7/1946  Sweden ........................ 251/208

OTHER REFERENCES
Dwyer Manufacturing Co. Bulletin No. F-31, P.O. Box 373, Michigan City, Ind. receipt date 10/24/66.

*Primary Examiner*—Richard C. Queisser
*Assistant Examiner*—John P. Beauchamp
*Attorney*—Mann, Brown, McWilliams & Bradway ABSTRACT: A flowmeter of simplified construction in the form of a one-piece molded plastic body defining a float tube, tubular mounting studs at the base and the top of the float tube that also form the fluid connections to and from the tube, and a cylindrical valve chamber at the base of the float tube and aligned with the bore of the base stud, in which chamber a hollow cylindrical valve member is mounted by interengagement with a tubular connector extending through the base stud bore and having resilient legs that engage behind an annular flange in the valve member. A float is contained in the float tube, and the valve member defines a teardrop port for sensitive metering control of fluid supplied to the float tube, with a sealing ridge being formed about the valve member port, and sealing ridges formed about either end of the valve member, that are in firm sealing engagement with the body wall forming the valve member.

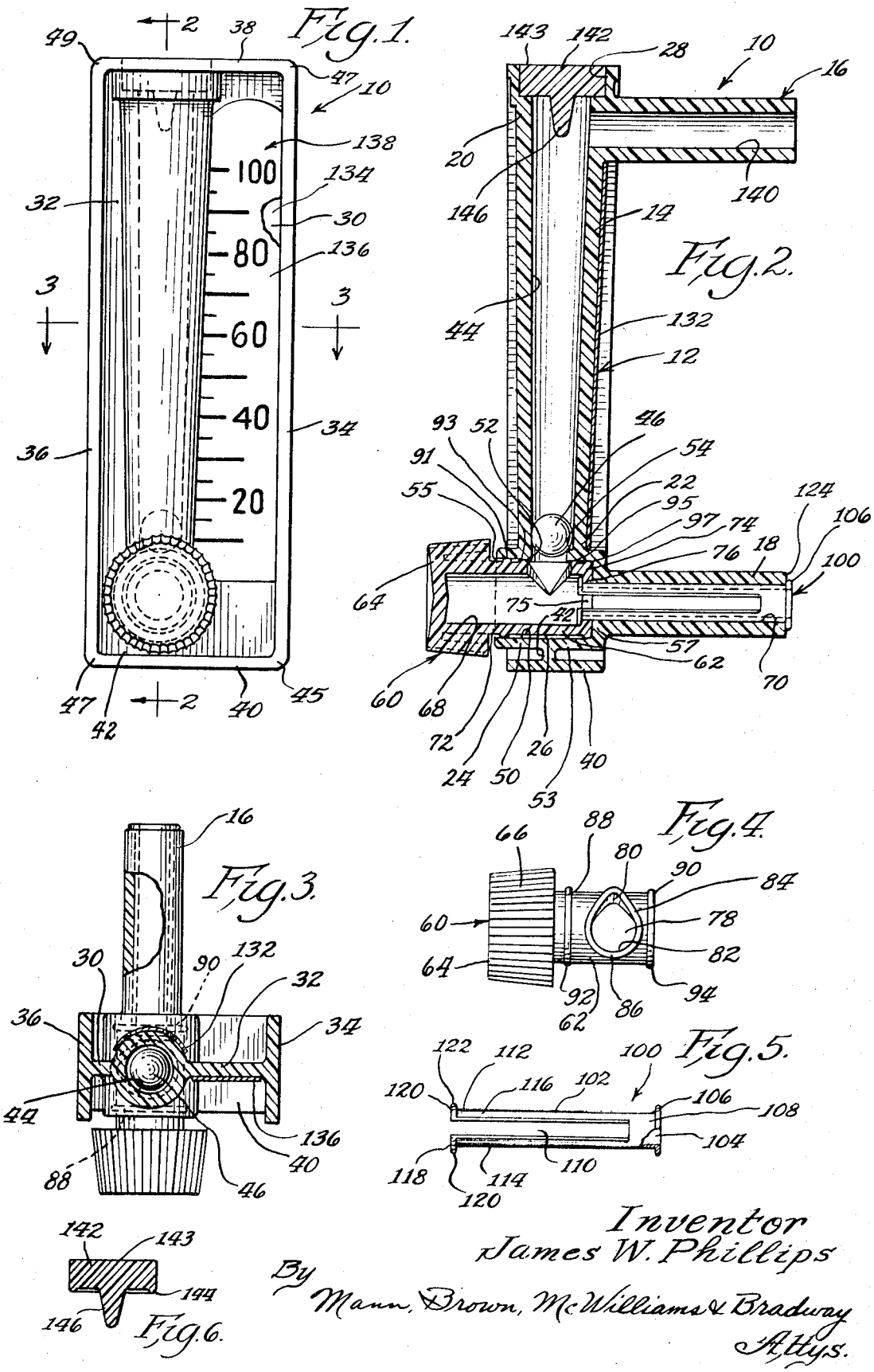

MOLDED PLASTIC FLOWMETER AND CONTROL VALVE THEREFOR

This invention relates to flowmeters and more particularly to a small and lightweight flowmeter that is reduced to the barest flowmeter essentials.

A principal object of this invention is to provide a flowmeter arrangement of essentially a one-piece molded body construction in which the valve control element is also of one-piece molded construction and is arranged in shape to be slipped into the valve chamber from one end thereof and to provide the desired sealing against fluid leakage, with a simple and yet effective interlock device cooperating between the body of the valve member to permanently mount it in its operative position.

Other objects of the invention are to provide a flowmeter arrangement that is diminutive yet efficient in character, and that is economical of manufacture, convenient to apply and use, and long lived in operation.

In accordance with this invention, the flowmeter consists essentially of a one-piece molded plastic body defining the meter float tube, tubular mounting studs at the base and top of the float tube that also form the fluid connections to and from the tube, and a cylindrical valve chamber at the base of the float tube and aligned with the bore of the base stud, which chamber receives a valve member of one-piece plastic hollow cylindrical construction, that is held in place by interengagement with the legs of a tubular connector that extends through the base stud bore. The valve member defines a teardrop port for sensitive metering control, with a sealing ridge formed thereabout and sealing ridges formed about either end of the valve member, that are in firm sealing engagement with the meter body wall defining the valve chamber for effective fluid sealing purposes. The float tube bore is formed about a tapered mold core pin which defines the variable orifice of the float tube. The molded body that is defined about the core pin defines an opening at the top of the float tube which is closed by a one-piece cap element that is ultrasonically welded in place and defines a float stop that projects down into the float tube sufficiently to keep the float from leaving the meter through its top stud.

Yet other objects, uses and advantages will be obvious or become apparent from a consideration of the following detailed description and the application drawing.

In the drawing:

FIG. 1 is a frontal view of a flowmeter embodying the present invention;

FIG. 2 is a diagrammatic cross-sectional view taken substantially along line 2—2 of FIG. 1;

FIG. 3 is a diagrammatic cross-sectional view taken substantially along line 3—3 of FIG. 1;

FIG. 4 is a plan view of the one-piece plastic valve member that forms a part of the flowmeter of FIGS. 1 and 3;

FIG. 5 is a plan view of the tubular connector that secures the valve member in its operating position within the flowmeter; and FIG. 6 is a sectional view through the float tube cap and ball stop prior to application of same to the float tube body shown in FIGS. 1 and 2.

However, it is to be understood that the specific drawing figures provided are supplied primarily to comply with the requirements of the Patent Code and that the invention may have other embodiments that will be obvious to those skilled in the art.

Reference numeral 10 of the drawing generally indicates a preferred embodiment of the invention comprising a body 12 of one-piece molded plastic construction defining a float tube 14, a tubular mounting stud 16 at the top 20 of the float tube, a cylinder 24 at the base 22 of the float tube defining a cylindrical valve chamber 26, an opening 28 at the top 20 of the float tube 14, and a tubular mounting stud 18 adjacent the base of the float tube and in alignment with the valve chamber 26. Extending laterally from either side of the float tube are webs 30 and 32, and projecting forwardly and rearwardly of the webs 30 and 32 are side flanges 34 and 36, top flange 38, and bottom flange 40, the side flanges 34 and 36 merging into the top flanges 38 and 40 at the corners 43, 45, 47 and 49 of the body 12. The lower end or base 22 of the float tube merges into cylinder 24 which is interposed between the webs 30 and 32 that merge together as at 42 underneath the cylinder 24.

The float tube, as is conventional, defines a tapering, upwardly diverging bore 44 in which is mounted the conventional ball-type float 46. Bore 44 in practice is formed by a tapered core pin (of the molding arrangement in which body 12 is formed) which projects through and forms the opening 28 at the top of the body 12.

The cylinder 24 is defined by a cylindrical wall 53, forming an inner cylindrical chamber surface 50, a forwardly facing opening 55, and a rear wall 57. Wall 53 is formed with a port 52 that provides communication between the chamber 26 and the float tube or bore 44. Port 52 is shaped so as to define a ledge 54 that precludes the ball float 46 from dropping through port 52. Base stud 18 is integral with rear wall 57, and is coaxial with the axis of cylinder 24.

Received within the chamber 26 defined by the cylinder 24 and extending outwardly of opening 55 is a hollow one-piece valve member 60 defining a cylindrical body portion 62 and a knob or handle portion 64 that is preferably knurled as at 66.

The valve member 60 defines a bore 68 which is coaxial with the bore 70 of the base stud 18. The bore 68 is defined by a cylindrical wall 72 which at the inner end 74 of the valve member merges into a flange 76 that extends radially inwardly of the valve member body portion 62 to a diameter that is substantially the same as the diameter of the bore 70 of base stud 18, and thus defines valve port or opening 75.

The outer diameter of the wall 72 of the valve member cylindrical portion 62 substantially complements the diameter of the surface 50 of cylinder 24, the wall 72 being further formed to define a teardrop-shaped orifice opening or port 78 that defines a tapered narrow portion 80 which diverges into the larger rounded portion 82. Formed about the port or orifice opening 78 is a continuous sealing ridge 84 having a smoothly rounded top surface 86.

The wall 72 also defines annular sealing ridges 88 and 90 at either end of the valve member of a cross-sectional configuration similar to the sealing ridge 94, ridge 80 defining a smooth rounded exterior surface 92 while ridge 90 defines smoothly rounded exterior surface 94.

The valve member 16 is preferably formed from a suitable relatively soft plastic material, such as polyethylene, polyurethane or polypropylene or some other form of resilient rubberlike material, and when valve member body portion 62 is inserted in valve member 26, the sealing ridges 84, 88 and 90 tend to flatten out, as indicated at 91, 93, 95 and 97, to form the necessary fluidtight seal between the cylinder 26 and the valve member 60. For this purpose, the body 12 is formed out of a relatively harder or more rigid material, such as styrene acrylonitrile, polycarbonate, or the like, that is shatter resistant.

Valve member 60 is held in its operative position within the cylinder 26 by a novel tubular connector 100, which comprises (see FIG. 5) an elongate tubular body 102 defining a bore 104 and including a flange 106 at its end 108. Body 102 is further formed to define a slot 110 extending from the end 112 thereof to adjacent its end 108 to define the body 102 into a pair of legs 114 and 116, each of which has, at the end 112 of body 102, a flanged end portion 118 and 120, respectively that form the respective feet 120 and 122 on the respective leg portions 114 and 116.

Connector 100 is formed from a suitable resiliently flexible material such as brass or its equivalent in metals or plastics. As indicated in FIG. 2, connector 100 secures the valve member 60 in place by being disposed within the base stud bore 70 with its flanged end 106 against the end 124 of stud 18, and its feet 120 and 122 behind the flange 76 of valve member 60. Thus, the body 102 should have the proportioning lengthwise thereof that is indicated in FIG. 2, such that when the flange 106 engages the end 124 of stud 18, the feet 120 and 122 are disposed behind the flange 76 of valve member 16.

Connector 100 is applied to the stud 18 by bending the legs 114 and 116 toward each other sufficiently to insert the feet 120 and 122 within the bore 70 of stud 18, and after the valve member 60 is in place, pressing the body 102 toward the valve member until the flange 106 engages the end 124 of stud 18. At this point, the feet 120 and 122 of the legs 114 and 116 will have slipped through port 75 and snapped behind the valve member flange 76, the resiliency of the legs 114 and 116 biasing the feet 120 and 122 radially outwardly of the connector 100 to achieve the permanent connection between the connector 100 and valve member 60 that is shown in FIG. 2. For this purpose, the diameter of bore 75 should be substantially the same as that of bore 70.

As indicated in FIGS. 2 and 3, the rearwardly facing side 130 of the float tube 14 is preferably covered with a pressure-sensitive white vinyl tape 132 for improved observation of the float 46, and the web 30 and its forwardly facing surface 134 has applied thereto a thin aluminum adhesive-backed strip 136 having applied thereto suitable scale indicia 138.

At the top of float tube 14, bore 140 of stud 16 communicates with bore 44. Top opening 28 is closed by cap 142 (see FIG. 6) by employing a suitable ultrasonic welding process about its rim 143, which is preferably ridged as at 144 for this purpose to insure a liquidtight joint, cap 142 being pressed into place as ridge 144 liquefies to insure that a perfect seal is effected about the rim of the cap. Cap 142, which is made from the same material as body 12, as by employing a suitable injection-molding process, includes a depending ball stop 146 to preclude ball 46 from entering bore 140.

In use, the flowmeter 10 assembled as shown in FIGS. 1–3 is applied to the panel of gas-mixing and other multiflow devices by having the studs 16 and 18 inserted through appropriately spaced holes formed in the panel, and hose connections secured to the studs 16 and 18 in such a manner that the flowmeter 10 is securely held between the ends of the hoses and the meter body flanges 34, 36, 38 and 40. Valve member 60, being journaled in place within cylinder 24, is turned counterclockwise of FIG. 1 to open port 78 of valve member 60 to port 52 of the body 12 thereby moving the narrow portion of port 78 into communication with the port 52 for sensitive flow control. Fluid flow proceeds through bore 104 of connector 100 into bore 68 of the valve member 60, and thence through ports 78 and 52 into and through bores 44 and 140. The position of ball 46 relative to scale indicia 138 indicates the rate of flow through flowmeter 10.

It will thus be seen that I have provided a flowmeter arrangement that reduces the flowmeter to its barest essentials and yet provides efficient highly effective flowmeter arrangement. The flowmeter is inexpensive to manufacture and is operable in comparatively small sizes. Body 12 provides in one integral piece the float tube 14, a frame for supporting same (webs 30 and 32 and flanges 34, 36, 38 and 40), tubular mounting studs 16 and 18 that also form the fluid-conducting conduits to and from the body 12, and cylinder 24. Valve member 60, including its seals (provided by its sealing ridges 84, 88, and 90) is of one-piece construction, it being of hollow tubular form, and being formed from a relatively soft material, as compared to that from which the body 12 is formed, it is readily applied to full sealing relation with the cylinder 24 by merely pressing same into place, where it is held by one-piece connector 100.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A flowmeter comprising:

a one-piece body formed to define:

a float tube having a tapering bore diverging upwardly, tubular mounting studs at the top and base of said float tube, and projecting from said body to defining outwardly projecting stud end portions, and a valve chamber at the base of said float tube and aligned with the bore of said base stud at one end thereof and being open at the other end thereof, said chamber being defined by a substantially cylindrical wall that is in coaxial relation to said base stud bore and that extends between said ends thereof, said chamber wall defining a passage at the base of said float tube communicating with said float tube bore, a cylindrical valve member received in said chamber including a sidewall defining a bore aligned with said base stud bore and a port adapted to be aligned with said chamber wall passage to permit fluid flow between said base stud bore and said passage, with the external surface of said valve member sidewall being coaxial with and substantially juxtaposed to said chamber wall, a tubular connector mounted in said base stud bore and defining a bore that is in fluid flow communication with said valve member bore and a flange engaging said base stud end portion, said connector and said valve member including interengaging means for holding said valve member in said chamber, a float in said float tube, and means for sealing said valve member port and bore against fluid leakage between said chamber wall and said valve member wall, said interengaging means comprising:

a flange defined by said valve member and extending radially inwardly thereof, said connector defining a body portion extending through said base stud bore and including one or more resiliently flexible legs extending longitudinally thereof and terminating in laterally directed flange portions, said legs being proportioned such that when said connector flange engages said base stud end portion, said leg flange portions are received behind said valve member flange.

2. The flowmeter set forth in claim 1 wherein:

said valve chamber defines a rear wall at said one end thereof that is in substantial concentric relation about said base stud bore, said connector holding said valve member against said rear wall.

3. The flowmeter set forth in claim 1 wherein:

said base stud bore is defined by a cylindrical wall extending lengthwise of said base stud, said connector body has an outer diameter substantially complementing the diameter of said base stud wall, and said valve member flange defines a port to said valve member bore having a diameter that is substantially equivalent to that of said base stud bore, whereby said legs on being inserted into said base stud bore are deflected inwardly of said connector body by the engagement of the flange portions thereof with said base stud wall, said legs resiliently snapping said flange portions thereof behind said valve member flange when said connector flange engages said base stud end portion.

4. A flowmeter comprising:

a one-piece body formed to define:

a float tube having a tapering bore diverging upwardly, tubular mounting studs at the top and base of said float tube, and projecting from said body to defining outwardly projecting stud end portions, and a valve chamber at the base of said float tube and aligned with the bore of said base stud at one end thereof and being open at the other end thereof, said chamber being defined by a substantially cylindrical wall that is in coaxial relation to said base stud bore and that extends between said ends thereof, said chamber wall defining a passage at the base of said float tube communicating with said float tube bore, a cylindrical valve member received in said chamber including a sidewall defining a bore aligned with said base stud bore and a port adapted to be aligned with said chamber wall passage to permit fluid flow between said base stud bore and said passage, with the external surface of said valve member sidewall being coaxial with and substantially juxtaposed to said chamber wall, a tubular connector mounted in said base stud bore and defining a bore that is in fluid flow communication with said valve member bore and a flange engaging said base stud end portion, said connector and said valve member including interengaging means for holding said valve member in said chamber, a float in said float tube, and means for sealing said valve member port and bore against fluid leakage between said chamber wall and said valve member wall, said sealing means comprising:

a continuous sealing ridge formed about said valve member port in said valve member surface, and a sealing ridge formed about said valve member adjacent either end thereof, said sealing ridges being in firm fluid-sealing relation with said chamber wall, said body being formed from a relatively rigid material and said valve member is formed from a resiliently compressible material, said sealing ridges being proportioned to flatten against said cylindrical wall when said valve member is inserted in said chamber to provide said firm fluid-sealing inserted in said chamber to provide said firm fluid-sealing relation with said wall.

5. A flowmeter comprising:

a one-piece body formed to define:

a framed float tube having a tapering bore diverging upwardly, tubular mounting studs at the top and base of said float tube, and projecting from said body to defining outwardly projecting stud end portions, and a valve chamber at the base of said float tube and aligned with the bore of said base stud at one end thereof and being open at the other end thereof, said chamber being defined by a substantially cylindrical wall that is in coaxial relation to said base stud bore and that extends between said ends of said chamber, said chamber wall defining a passage at the base of said float tube communicating with said float tube bore, a generally cylindrical one-piece valve member received in said chamber and including a sidewall defining a bore aligned and communicating with said base stud bore and a port in said sidewall positioned to be aligned with said chamber wall passage to permit fluid flow between said base stud bore and said passage through said valve member bore, with the external surface of said valve member sidewall being coaxial with and substantially juxtaposed to said chamber wall, and a one-piece tubular connector mounted in said base stud bore and defining a bore that is in fluid flow communication with said valve member bore and a flange engaging said base stud end portion, said connector and said valve member including interengaging means for holding said valve member in said chamber, a float in said float tube, and means for sealing said valve member port and bore against fluid leakage between said chamber wall and said valve member wall, said sealing means comprising:

a continuous sealing ridge formed about said valve member port in said valve member surface, and a sealing ridge formed about said valve member adjacent either end thereof.

said sealing ridges being in firm fluid-sealing relation with said chamber wall, said body being formed from a relatively rigid, shatter-resistant material and said valve member being formed from a resiliently compressible material, said sealing ridges being integral with said valve member and proportioned to flatten against said cylindrical wall when said valve member is inserted in said chamber to provide said firm fluid-sealing relation with said wall.

* * * * *